(12) United States Patent
Abe

(10) Patent No.: US 6,421,190 B1
(45) Date of Patent: Jul. 16, 2002

(54) CEMENTED LENS GROUP

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 09/631,289

(22) Filed: Aug. 2, 2000

(30) Foreign Application Priority Data

Aug. 3, 1999 (JP) ............................................. 11-219649

(51) Int. Cl.[7] .......................... G02B 9/00; B32B 31/00; C03B 23/22
(52) U.S. Cl. ........................ 359/796; 359/797; 156/182; 65/38
(58) Field of Search .................................. 359/642, 796, 359/797, 661, 645, 647, 784; 156/182; 65/37, 38

(56) References Cited

U.S. PATENT DOCUMENTS 2,538,291 A * 1/1951 Bouwers ...................... 359/717
5,225,927 A   7/1993 Nozaki et al. .............. 359/355

FOREIGN PATENT DOCUMENTS

JP          62-43316       3/1987    ............ G02B/7/02

* cited by examiner

*Primary Examiner*—Georgia Epps
*Assistant Examiner*—David N. Spector
(74) *Attorney, Agent, or Firm*—Greenblum & Bernstein, P.L.C.

(57) ABSTRACT

A cemented lens group is formed by cementing three round lens elements. In the cemented lens group, the diameter of the intermediate lens element is made smaller than those of the other two lens elements.

3 Claims, 2 Drawing Sheets

CEMENTED LENS GROUP

BACKGROUND OF THE INVENTION

1. Field of the Invention

The present invention relates to the configuration of cemented lens group, in particular, to the configuration a cemented lens group constituted by three lens elements.

2. Description of the Related Art

A cemented lens group formed by cementing three lens elements has been used in a high-performance lens system, e.g., a Sonar-type photographing lens system, an Abbe-type eyepiece optical system and so forth, since the cemented lens group shows excellent performance in correcting aberrations, and causes few ghost images due to a surface reflection of lens elements thereof.

General procedures of cementing lens elements are as follows:

(i) applying a drop of cement onto a surface to be cemented of one lens element;

(ii) placing another lens element onto the surface of the lens element in (i);

(iii) removing bubbles trapped inside the cement;

(iv) centering the lens elements; and (v) hardening the cement by irradiating ultraviolet or by heating.

In the process of removing bubbles from the cement, one lens element is moved in radial directions so that bubbles together with the cement are forced to exit from the periphery of the cemented surfaces. Consequently, in such a cement-removing process, cement is inevitably overflown from the periphery of the cemented surfaces.

If the cement is hardened while a portion thereof remains overflown from the periphery of the cemented surfaces, the overflown portion will also be hardened, and will form burrs thereon. If this happens, the cemented lens group cannot be assembled into a lens supporting frame. Further, in the cemented lens group of the prior art, since cement may flow over a lens surface, the overflown cement has to be wiped off. For example, as shown in FIGS. 5 and 6, the conventional cemented lens groups, including three round lens elements L1(L4), L2(L5) and L3(L6), have two cemented surfaces from which cement may overflow. Therefore the process of wiping off the cement becomes complicated, which increases production costs of the cemented lens groups.

SUMMARY OF THE INVENTION

It is an object of the present invention to provide an inexpensive cemented lens group of three lens elements, which does not require a cement-removing process for overflown cement.

The present invention has been developed based on the conception that in a cemented lens group of three lens elements, if the diameters of the two lens elements other than the intermediate lens element, i.e., the front-most and rear-most lens elements, are arranged to be larger than the height, in the radial direction, of the overflown cement from the surfaces to be cemented, the overflown cement does not hamper the assembling process of the cemented lens group into a lens supporting frame.

In order to achieve the above object, there is provided a cemented lens group formed by cementing three round lens elements. In the cemented lens group, the diameter of the intermediate lens element is made smaller than those of the other two lens elements.

More specifically, the difference of the diameters between the intermediate and other two lens elements is determined so that the cement overflown from the surfaces to be cemented can be held in the groove formed by the intermediate lens element and other two lens elements. Further, it is practical to make the diameters of the other two lens elements the same.

The cemented lens group according to the present invention preferably satisfies the following condition:

$$0.01 < |\Delta D/D| < 0.3 \quad (1)$$

wherein $\Delta D$ designates the difference of the diameters of the intermediate lens element and the other two lens elements, or in the case where the other two lens elements have different diameters, the difference of the diameters of the intermediate lens element and one of the other two lens elements which is smaller than the rest thereof; and D designates the diameter of the intermediate lens element.

The present disclosure relates to subject matter contained in Japanese Patent Application No.Hei-11-219649 (filed on Aug. 3, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
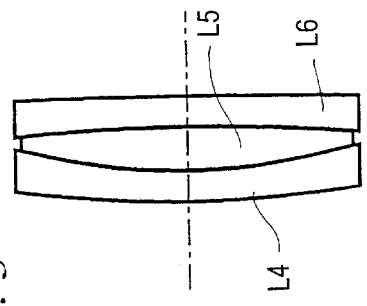
FIG. 1 is a cross-sectional view of a cemented lens group according to a first embodiment of the present invention.

FIG. 1 is a cross-sectional view of a cemented lens group according to the first embodiment of the present invention. The cemented lens group is formed by cementing three round lens elements, i.e., a positive lens element L1 (hereinafter, lens element L1), a negative intermediate lens element L2 (hereinafter, intermediate lens element L2) and a positive lens element L3 (hereinafter, lens element L3), in this order from the left of FIG. 1. The diameters of the lens elements L1 and L3 are larger than that of the intermediate lens element L2. Furthermore, the diameters of the lens elements L1 and L3 are made the same.

Figure 2:
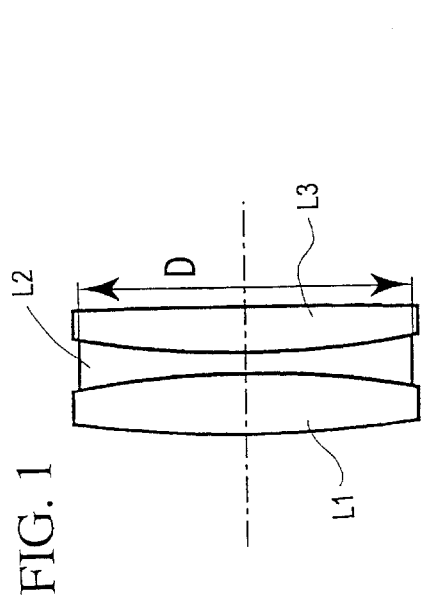
FIG. 2 is an enlarged cross-sectional view of the peripheral portion of the cemented lens group of FIG. 1, which is assembled into a lens supporting frame.

FIG. 2 is an enlarged cross-sectional view of the peripheral portion of the cemented lens group of FIG. 1, which is assembled into a lens supporting frame 11. As mentioned above, the diameters of the lens elements L1 and L3 are larger than that of the intermediate lens element L2, and the difference of the diameters (ΔD/2) between the intermediate lens element L2 and the other two lens elements L1 and L3 is determined so that the cement 12 does not overflow from the edge portions of the lens elements L1 and L3. In other words, the overflown cement 12 is held in the groove formed by the intermediate lens element L2 and the other two lens elements L1 and L3. Consequently, the overflown cement 12 does not hamper the assembling process of the cemented lens group into the lens supporting frame 11. Further, since the diameters of the other two lens elements L1 and L3 are the same, there is no need to provide stepped portions in the lens supporting frame 11, and the inner diameter of the lens supporting frame 11 can therefore be made uniform.

Figure 3:
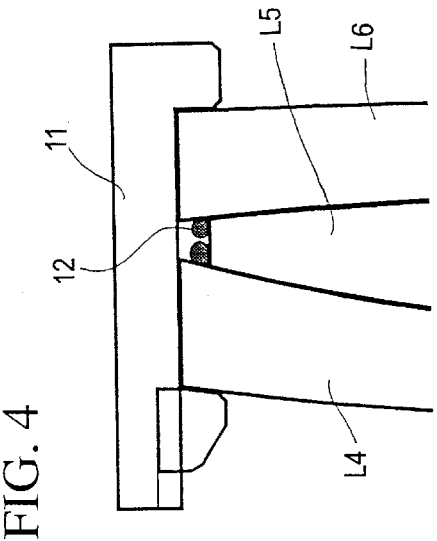
FIG. 3 is a cross-sectional view of a cemented lens group according to a second embodiment of the present invention.

FIG. 3 is a cross-sectional view of a cemented lens group according to the second embodiment of the present invention. The cemented lens group is formed by cementing three round lens elements, i.e., a negative lens element L4 (hereinafter, lens element L4), a positive intermediate lens element L5 (hereinafter, intermediate lens element L5), and a negative lens element L6 (hereinafter, lens element L6), in this order from the left of FIG. 3. The diameters of the lens elements L4 and L6 are larger than that of the intermediate lens element L5. Furthermore, the diameters of the lens elements L4 and L6 are made the same.

Figure 4:
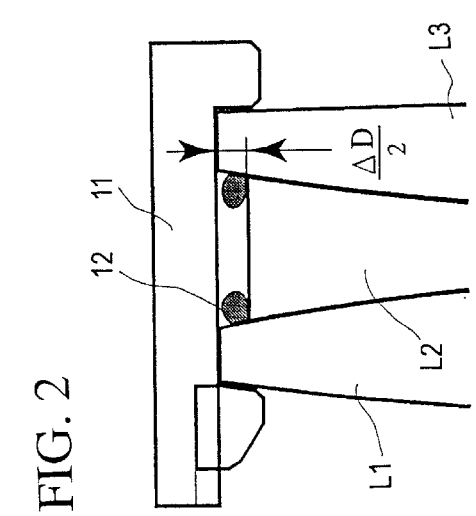
FIG. 4 is an enlarged cross-sectional view of the peripheral portion of the cemented lens group of FIG. 3, which is assembled into a lens supporting frame.
Figure 5:
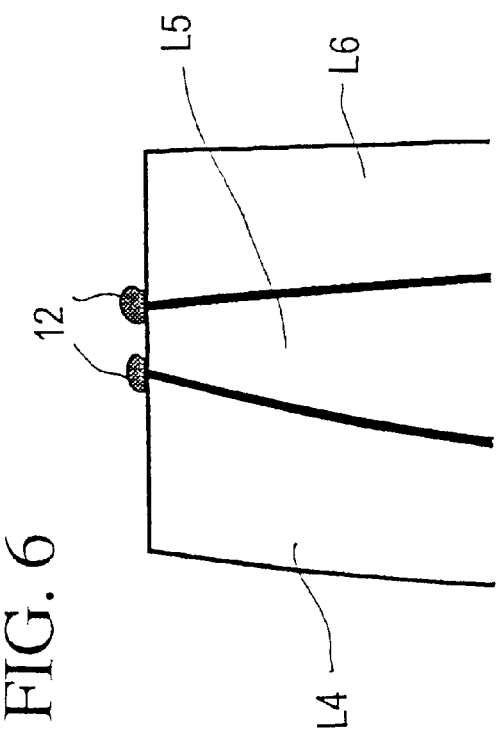
FIG. 5 is an enlarged cross-sectional view of the peripheral portion of the conventional cemented lens group of three lens elements.
Figure 6:
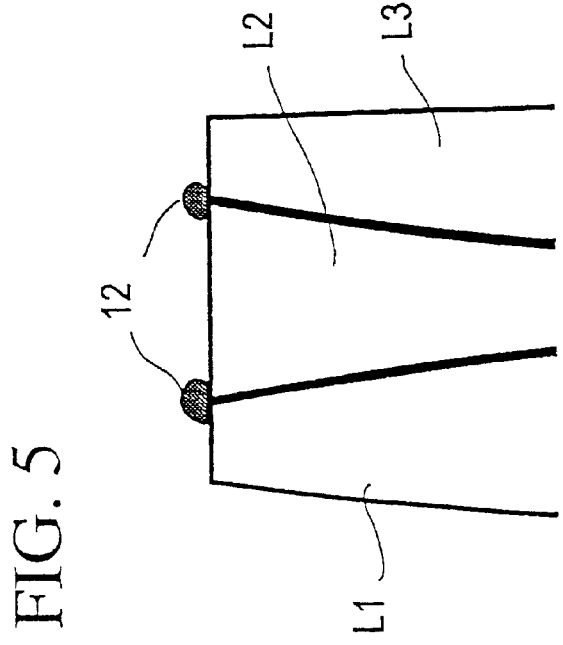
FIG. 6 is an enlarged cross-sectional view of the peripheral portion of the conventional cemented lens group of three lens elements.

FIG. 4 is an enlarged cross-sectional view of the peripheral portion of the cemented lens group of FIG. 3, which is assembled into a lens supporting frame 11. As mentioned above, the diameters of the lens elements L4 and L6 are larger than that of the intermediate lens element L5, and the difference of the diameters (ΔD/2) between the intermediate lens element L5 and the other two lens elements L4 and L6 is determined so that the cement 12 does not overflow from the edge portions of the lens elements L4 and L6. In other words, the overflown cement 12 is held in the groove formed by the intermediate lens element L5 and the other two lens elements L4 and L6. Consequently, the overflown cement 12 does not hamper the assembling process of the cemented lens group into a lens supporting frame 11. Further, since the diameters of the other two lens elements L4 and L6 are the same, there is no need to provide stepped portions in the lens supporting frame 11, and the inner diameter of the lens supporting frame 11 can therefore be made uniform.

If it is only required to assemble a cemented lens group into the lens supporting frame 11 so that the assembling process is not hampered by the overflown cement, it is sufficient just to provide the two lens elements and the intermediate lens element with different diameters, between which a surface to be cemented is formed. In other words, it is not necessary to make the diameter of the intermediate lens element smaller than those of the other two lens elements, i.e., the diameter of the intermediate lens element may be made larger than those of the other two lens elements. However, in a cemented lens group of three lens elements, if the diameter of the intermediate lens element is larger than those of the other two lens elements, the overflown cement from the surface to be cemented may further flow on the lens surfaces.

On the other hand, if the diameter of the intermediate lens element is made smaller than those of the other two lens elements, a groove is formed by the edge thickness of the intermediate lens element and the peripheral lens surfaces of the other two lens elements, thereby the overflown cement can be held in the groove, and no cement overflows onto the lens surfaces.

In a cementing process, an increase of diameter caused by the overflown cement from the cemented surfaces can be empirically made constant if the amount of cement to be used is adequately controlled. More specifically, by controlling the cement, an increase of diameter can be kept within a range of several to ten percent of a diameter of a lens element. In this respect, by determining the diameter of the intermediate lens element and those of the other two lens elements in accordance with condition (1), the overflown cement can be held in the groove formed by the edge thickness of the intermediate lens element and the peripheral lens surfaces of the other two lens elements. An increase of the diameter of the intermediate lens element, caused by the overflown cement, does not exceed the diameters of the other two lens elements.

If $|\Delta D/D|$ exceeds the lower limit of condition (1), the difference of the diameters with respect to the intermediate and other two lens elements becomes too small. As a result, the overflown cement will further flow from the periphery of the other two lens elements.

If $|\Delta D/D|$ exceeds the upper limit of condition (1), the diameters of the other two lens elements become too large, which causes cost and weight increase of the cemented lens group.

According to the above description, an inexpensive cemented lens group of three lens elements, which does not require a cement-removing process for overflown cement, can be obtained.

What is claimed is:

1. A cemented lens group comprising three round lens elements which are cemented to each other; wherein:

in said cemented lens group, the diameter of an intermediate lens element is smaller than the diameters of two lens elements other than said intermediate lens element; and the difference of the diameters between said intermediate and said other two lens elements is determined so that cement overflowed from the surfaces to be cemented can be held in a groove formed by said intermediate lens element and said other two lens elements.

2. The cemented lens group according to claim 1, wherein the diameters of said other two lens elements are equal.

3. The cemented lens group according to claim 1, wherein the following condition is satisfied:

$$0.01 < |\Delta D/D| < 0.3 \qquad (1)$$

wherein

ΔD designates the difference of the diameters of said intermediate lens element and said other two lens elements, or in the case where said other two lens elements have different diameters, the difference of the diameters of said intermediate lens element and one of said other two lens elements which is smaller than the rest thereof; and D designates the diameter of said intermediate lens element.

* * * * *